(12) United States Patent
Taniguchi

(10) Patent No.: US 12,036,917 B2
(45) Date of Patent: Jul. 16, 2024

(54) AUTONOMOUS VEHICLE, DELIVERY SYSTEM, AND PROGRAM

(71) Applicant: ZMP INC., Tokyo (JP)

(72) Inventor: Eko Taniguchi, Tokyo (JP)

(73) Assignee: ZMP INC., Tokyo (JP)

( * ) Notice: Subject to any disclaimer, the term of this patent is extended or adjusted under 35 U.S.C. 154(b) by 518 days.

(21) Appl. No.: 17/311,859

(22) PCT Filed: Dec. 26, 2019

(86) PCT No.: PCT/JP2019/051294
§ 371 (c)(1),
(2) Date: Jun. 8, 2021

(87) PCT Pub. No.: WO2020/145189
PCT Pub. Date: Jul. 16, 2020

(65) Prior Publication Data
US 2022/0017010 A1 Jan. 20, 2022

(30) Foreign Application Priority Data
Jan. 12, 2019 (JP) .................................. 2019-003919

(51) Int. Cl.
*B60Q 1/50* (2006.01)
*B60Q 1/38* (2006.01)
(Continued)

(52) U.S. Cl.
CPC .......... *B60Q 1/5035* (2022.05); *B60Q 1/381* (2022.05); *B60Q 1/5037* (2022.05); *B60Q 1/507* (2022.05);
(Continued)

(58) Field of Classification Search
None
See application file for complete search history.

(56) References Cited

U.S. PATENT DOCUMENTS 10,248,120 B1 * 4/2019 Siegel ................. G05D 1/0088
2007/0192910 A1 * 8/2007 Vu .......................... G16H 40/63
901/17
(Continued)

FOREIGN PATENT DOCUMENTS

JP 2007181888 A 7/2007
JP 2013225253 A 10/2013
(Continued)

OTHER PUBLICATIONS

Machine translation of KR 20160091585 A (Year: 2016).*
(Continued)

*Primary Examiner* — Amelia Vorce
*Assistant Examiner* — Kyle S Park
(74) *Attorney, Agent, or Firm* — Millen, White, Zelano & Branigan P.C.; William F. Nixon

(57) ABSTRACT

Provided are an autonomous vehicle 100 traveling along a set route, a delivery system, and a program, the autonomous vehicle including a pair of display units 103 installed at left and right on the front face of the main body and a monitoring camera 104 for shooting the front, sides, and rear of the autonomous vehicle 100, wherein by displaying predetermined eye-shaped images on the display unit 103 based on the state of the autonomous vehicle 100 and the images shot by the monitoring camera 104, the eye-shaped images are changed depending on the state of obstacles to ensure friendliness to people in stores and at delivery destinations as well as surrounding people during travel.

20 Claims, 10 Drawing Sheets

(51) Int. Cl.

| | | |
|---|---|---|
| *B60Q 5/00* | (2006.01) | |
| *B60W 60/00* | (2020.01) | |
| *G05D 1/00* | (2006.01) | |
| *G05D 1/02* | (2020.01) | |
| *G06F 3/14* | (2006.01) | |
| *G06K 9/00* | (2022.01) | |
| *G06Q 10/08* | (2024.01) | |
| *G06V 20/58* | (2022.01) | |
| *G06V 40/10* | (2022.01) | |
| *G08G 1/005* | (2006.01) | |
| *H04N 7/18* | (2006.01) | |

(52) U.S. Cl.
CPC ............. *B60Q 1/509* (2022.05); *B60Q 1/543* (2022.05); *B60Q 1/547* (2022.05); *B60Q 1/549* (2022.05); *B60Q 5/005* (2013.01); *B60W 60/00256* (2020.02); *G05D 1/0231* (2013.01); *G06F 3/1446* (2013.01); *G06V 20/58* (2022.01); *G06V 40/103* (2022.01); *G08G 1/005* (2013.01); *H04N 7/185* (2013.01); *B60W 2420/403* (2013.01); *B60W 2420/408* (2024.01); *B60W 2556/45* (2020.02)

(56) References Cited

U.S. PATENT DOCUMENTS

| | | | |
|---|---|---|---|
| 2017/0140491 A1 | 5/2017 | Hayashi et al. | |
| 2018/0024554 A1* | 1/2018 | Brady | G06Q 10/0833 701/23 |
| 2018/0081365 A1* | 3/2018 | Asukai | G05D 1/0212 |
| 2018/0174460 A1* | 6/2018 | Jung | G08G 1/005 |
| 2019/0034967 A1* | 1/2019 | Ferguson | G06F 16/955 |
| 2019/0049988 A1 | 2/2019 | Meij | |
| 2019/0056751 A1* | 2/2019 | Ferguson | G06K 19/06028 |
| 2019/0232501 A1* | 8/2019 | Funazukuri | G06N 3/008 |
| 2019/0279070 A1 | 9/2019 | Hayashi et al. | |
| 2019/0294171 A1* | 9/2019 | Maeda | G05D 1/0274 |
| 2021/0255630 A1* | 8/2021 | Suzuki | G05D 1/0214 |

FOREIGN PATENT DOCUMENTS

| | | |
|---|---|---|
| JP | 2017094409 A | 6/2017 |
| JP | 2018058656 A | 4/2018 |
| KR | 20160091585 A | 8/2016 |
| WO | 2017156586 A1 | 9/2017 |
| WO | 2018097089 A1 | 5/2018 |

OTHER PUBLICATIONS

Machine translation of JP 2007181888 A (Year: 2007).*
Japanese Office Action in corresponding Japanese Application, JP 2020-565716 issued on Mar. 7, 2023 (pp. 1-4) and its Machine English Translation.
International Search Report for PCT/JP2019/051294 dated Mar. 10, 2020.
English Abstract of JP2013225253, Publication Date: Oct. 31, 2013.
English Abstract of JP2018058656, Publication Date: Apr. 12, 2018.
Office Action in corresponding Chinese Patent Application, 21980087204.4 dated Apr. 14, 2023 (pp. 1-11) and english translation thereof (pp. 1-14).

* cited by examiner

FIG. 1
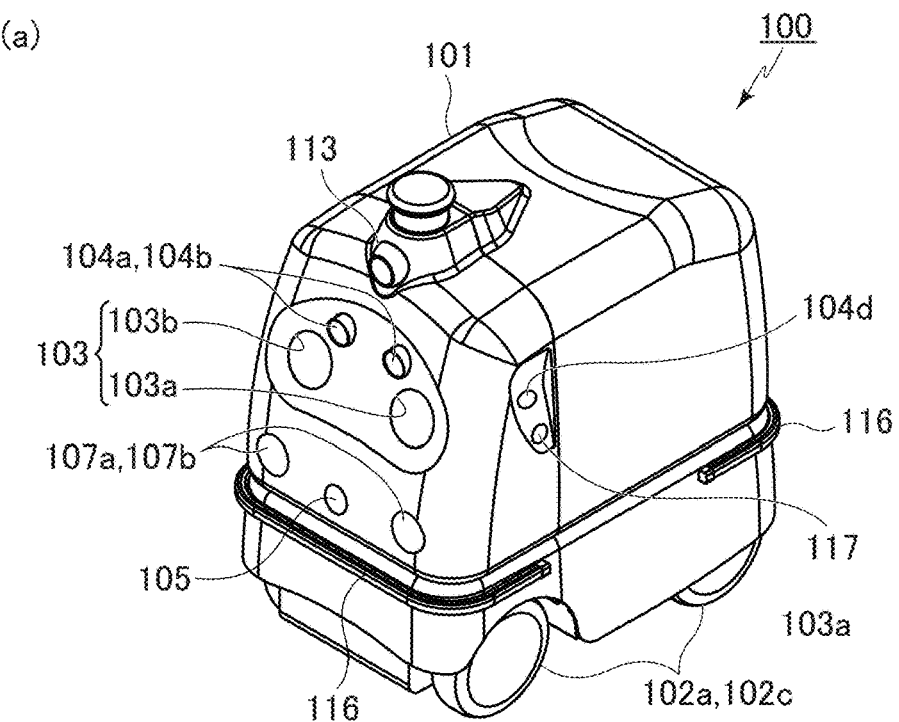
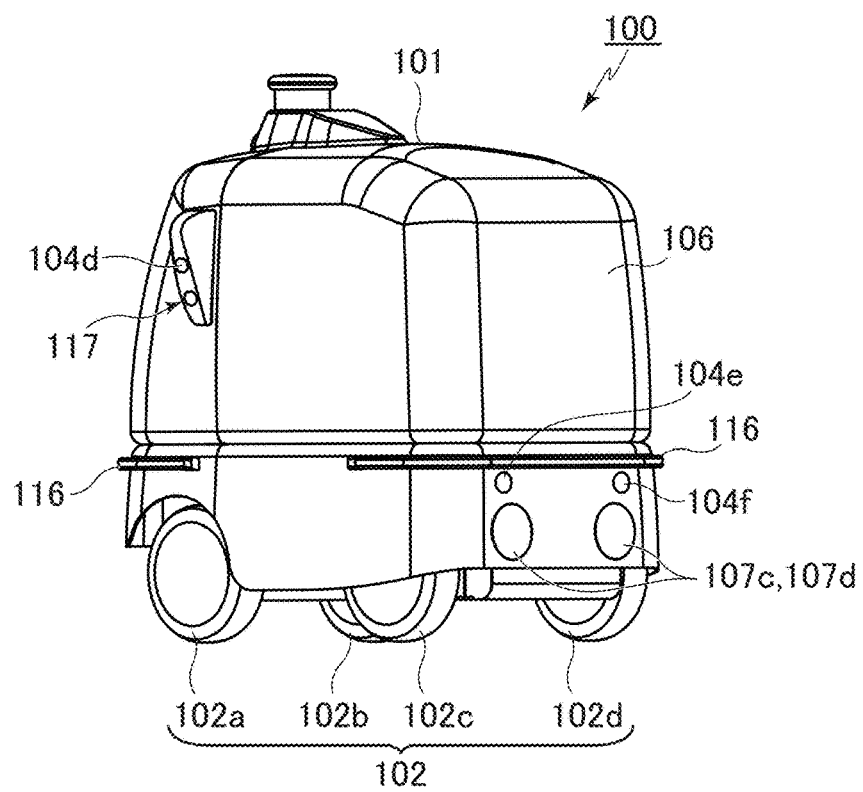

FIG. 6

| No. | Voice output |
|---|---|
| 1 | I am going out for delivery. |
| 2 | Hello. |
| 3 | Good morning. |
| 4 | Good evening. |
| 5 | I am CarriRo® Deli of ////////. |
| 6 | I am waiting at the red signal. |
| 7 | I am going out for delivery. |
| 8 | Will you please give way? |
| 9 | Thank you very much. |
| 10 | I am turning right. |
| 11 | I am turning left. |
| 12 | I apologize for the inconvenience. Please be careful. |
| 13 | Thank you for waiting. |
| 14 | I have come to deliver the item you ordered. |
| 15 | Hold up your smartphone to the camera on the side. |
| 16 | Open the locker and take out the product. |
| 17 | Now that the product has been taken out, please close the door. |
| 18 | Will you please close the locker? |
| 19 | Thank you for using the service. We look forward to serving you again. |
| 20 | Will you please assess our service? |
| 21 | Five stars |
| 22 | Four stars |
| 23 | Three stars |
| 24 | Two stars |
| 25 | One star |
| 26 | Thank you very much for your reply, N stars (N: any one of 1 to 5). |
| 27 | I have just returned. |
| 28 | I am waiting. Sorry for the inconvenience. |
| 29 | Thank you for your hard work for today. |
| 30 | I look forward to working with you tomorrow. |

US 12,036,917 B2

AUTONOMOUS VEHICLE, DELIVERY SYSTEM, AND PROGRAM

TECHNICAL FIELD

The present invention relates to an autonomous vehicle, and a delivery system and a program for the delivery system that use this autonomous vehicle.

BACKGROUND ART

As a goods delivery system using an autonomous vehicle that travels on a set route, the unmanned delivery system disclosed in Patent Literature 1 is known for example.

The delivery system disclosed in Patent Literature 1 delivers goods specified by a user 3 from a user terminal 2 by using an autonomous traveling system 8.

CITATION LIST

Patent Literature

Patent Literature 1: JP 2018-58656 A

SUMMARY OF INVENTION

Problem to be Solved by the Invention

The conventional delivery system using autonomous vehicles can deliver commodities and other items by the autonomous vehicles, and is thus an useful technology that brings great benefits including reduced labor costs and increased workability. However, since the delivery is performed by using machines and not by manpower, users are likely to get an cold impression of the system, and also interference with and obstructions by pedestrians and moving bodies such as bicycles and automobiles might occur during delivery operations, which have been obstacles in use.

In view of the problems described above, the present invention intends to provide an affable autonomous vehicle that is unlikely to allow interference with other moving bodies and obstacles including pedestrians to occur, a delivery system for delivering goods and other items (hereinafter collectively referred to as "goods") from stores to delivery destinations, and a program for the delivery system.

Means for Solving the Problem

The autonomous vehicle according to the present invention intending to solve the above-mentioned problems travels along predetermined routes, comprises: a pair of display units provided on front-left and front-right sides of the autonomous vehicle; and a monitoring camera for shooting the front, sides, and rear of the autonomous vehicle viewed from its direction of travel, wherein predetermined eye-shaped images are displayed on the display units based on the state of the autonomous vehicle and/or images shot by the monitoring camera.

The autonomous vehicle according to the present invention may be allowed to display, on the display unit, a first eye-shaped image looking forward when the autonomous vehicle goes straight ahead, a second eye-shaped image looking right when the autonomous vehicle turns right, a third eye-shaped image looking left when the autonomous vehicle turns left, a fourth eye-shaped image showing that traveling is being suspended because the autonomous vehicle has detected a person or an obstacle, a fifth eye-shaped image showing a greeting when the autonomous vehicle detects a person, and a sixth eye-shaped image showing gratitude when the autonomous vehicle detects a person, stops traveling, and the person gives way to the autonomous vehicle. The first to sixth eye-shaped images may be allowed to change each shape with time.

The autonomous vehicle according to the present invention may be provided with a speaker that outputs predetermined voices based on the state of traveling of the autonomous vehicle and/or the images shot by the monitoring camera. The autonomous vehicle may be further provided with a display unit on at least one face of the rear and both sides of the main body of the autonomous vehicle.

A program for controlling any one of the autonomous vehicles described above may include step S1 where a monitoring sensor capable of acquiring distance information detects a person, step S2 where a positional information concerning the coordinate and the eye height of the person is detected from the monitoring sensor, step S3 for controlling display so that the line of sight of the display unit follows the person based on the coordinate showing the positional information concerning the person obtained in Step S2, step S4 for detecting whether the person has passed the vehicle is detected by the monitoring sensor or the distance sensor, step S5 where the display is controlled, when the person has passed the vehicle in step S4, to stop allowing the line of sight of the display unit to follow the person, and output an eye-shaped image that coincides with the traveling state, completing the control of changing the line of sight, and step S6 for returning to step 2, when the person has not passed the vehicle in step S4, so that the line of sight of the display unit follows the person. The monitoring sensor may be configured with any one of a module for obtaining the positional information by using a monocular camera or stereo camera, a two-dimensional LiDAR, and a three-dimensional LiDAR.

The delivery system according to the present invention to solve the above-mentioned problems, comprising: a user terminal; a store server to which delivery of a product is requested via the user terminal; an autonomous vehicle that delivers the product by traveling along a set route; and a monitoring server for monitoring the state of the autonomous vehicle, all of the above being connected to a network, wherein the user terminal comprises: a product ordering unit for ordering the delivery of a product to the store server; and an authentication presenting unit for presenting an authentication code for allowing the autonomous vehicle to authenticate the user terminal, the store server comprises: a product order receiving unit for receiving an order for delivery of the product from the user terminal, the autonomous vehicle comprises: a delivery route setting unit for setting the route of delivery of the product; a main body having a housing unit for housing the product; a pair of display units provided at front-left and front-right sides of the autonomous vehicle; and a monitoring camera for shooting the front and sides the autonomous vehicle and wherein the display unit displays predetermined eye-shaped images based on the state of the autonomous vehicle and/or images shot by the monitoring camera.

The monitoring server may comprise: a monitoring target registering unit for registering the autonomous vehicle; and a monitoring executing unit for periodically monitoring the state of the autonomous vehicle. The autonomous vehicle preferably comprises: a state transmitting/receiving unit for transmitting the state of the autonomous vehicle to the monitoring server and receiving control signals from the monitoring server, the state transmitting/receiving unit transmits, as required, a sensor information concerning the state of the autonomous vehicle and an image information from the monitoring camera to the monitoring server, and transmits the state of the autonomous vehicle to the monitoring server in response to a request from the monitoring executing unit of the monitoring server.

Effects of the Invention

According to the present invention, predetermined eye-shaped images are displayed on the display unit of the autonomous vehicle based on the state of the autonomous vehicle and/or the images shot by the monitoring camera. By changing the eye-shaped images according to the traveling direction of the autonomous vehicle and the situations of nearby pedestrians and obstacles, a friendly autonomous vehicle, the delivery system, and the program can be provided.

BRIEF DESCRIPTION OF DRAWINGS

FIG. 1 shows the appearance of an autonomous vehicle according to the embodiment 1 of the present invention, where (a) is a front perspective view, and (b) is a rear perspective view.

FIG. 6 is a table showing the details of voice output in the embodiment 1.

EMBODIMENTS OF THE INVENTION

Figure 2:
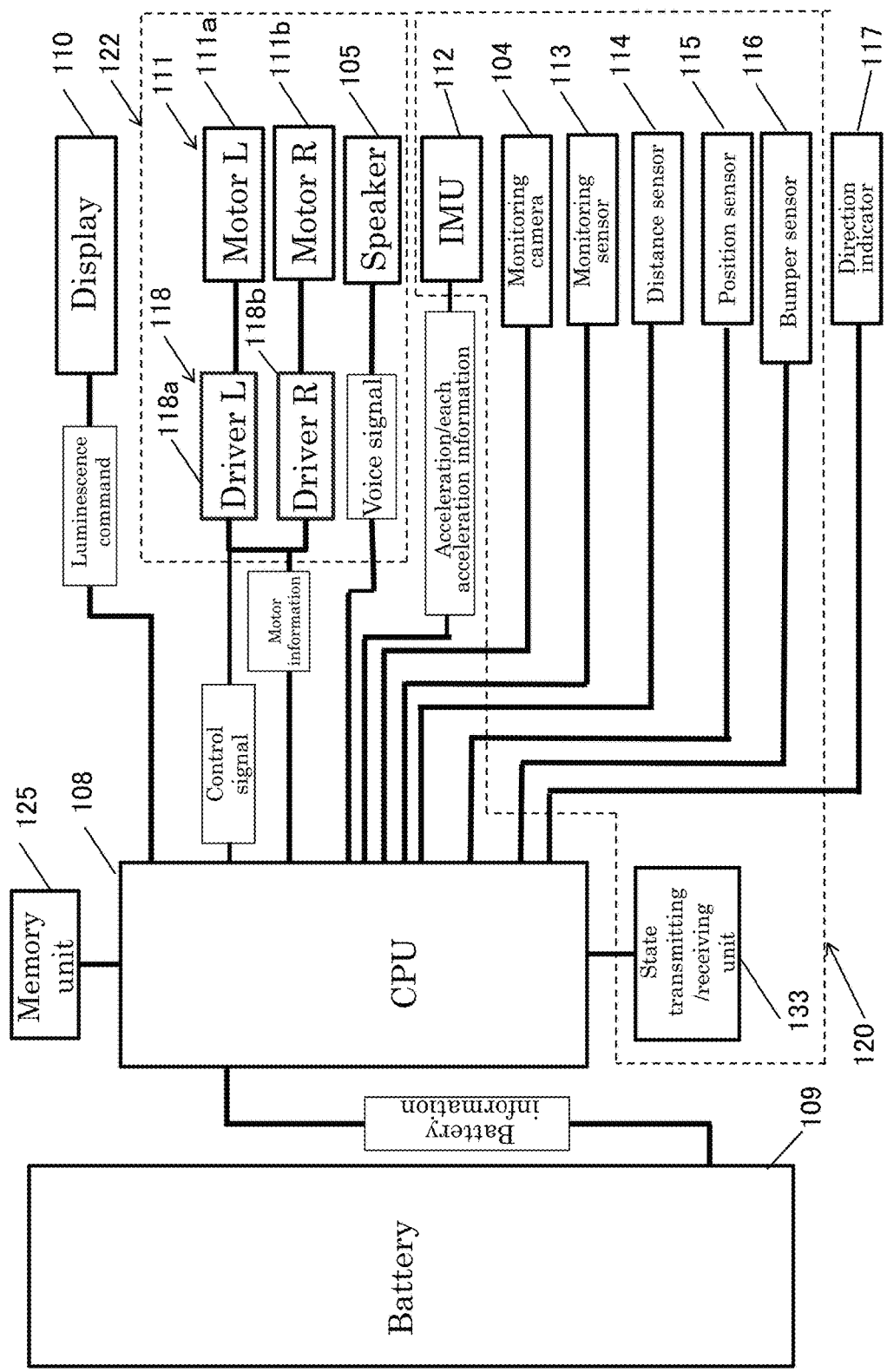
FIG. 2 is a chart showing the structure of the control circuit of the autonomous vehicle in the embodiment 1.

An autonomous vehicle according to an embodiment of the present invention and a delivery system using this autonomous vehicle will hereafter be described by referring to drawings.

Embodiment 1

FIG. 1 is a view showing the appearance of the autonomous vehicle 100 according to the embodiment 1 of the present invention. As shown in FIG. 1, the autonomous vehicle 100 according to the embodiment 1 includes a main body 101 having an approximately cubic appearance, and wheels 102 provided to the main body 101.

In the embodiment 1, the main body 101 of the autonomous vehicle 100 includes a display unit 103, monitoring cameras 104, a speaker 105, a product housing unit 106, lights 107, and direction indicators 117. In the case shown, front lights 107a, 107b are installed on the front face of the autonomous vehicle 100, and rear lights 107c, 107d are installed on its back. As the lights 107, display systems using the liquid crystal or light-emitting diodes can be used. As the rear lights 107c, 107d, a full-color light-emitting diode display where high-brightness light-emitting diodes are arranged at high density can preferably be used.

As shown in FIG. 1, ear-shaped direction indicators 117 are arranged at the top left and top right on both sides of the autonomous vehicle 100 so that people around the autonomous vehicle 100 can see the turning direction of the vehicle from the front, sides, and rear of the vehicle 100. The direction indicators 117 are lamps using light-emitting diodes (LED), etc.

The display unit 103 need not be installed directly on the main body 101, provided that it is arranged at a clearly-visible position on the front side of the autonomous vehicle 100. In this embodiment, the display unit 103 is disposed on the front side of the main body 101 to display eye-shaped images, which will be described later. The display unit 103 in this embodiment includes a display 110 and a pair of openings 103a, 103b arranged on the front side of the main body 101. Under the display unit 103, a speaker 105 is installed. The display 110 is preferably a display unit using liquid crystal or light-emitting diode, and a full-color light-emitting diode display where high-brightness light-emitting diodes are arranged at high density is furthermore preferable.

The monitoring camera 104 shoots images around the autonomous vehicle 100. The monitoring camera 104 shoots images of the state of roads and pedestrians at the front, sides, and rear of the autonomous vehicle 100 to monitor them, and includes a pair of front monitoring cameras 104a, 104b arranged at left and right on the front face of the main body 101, and side monitoring cameras 104c, 104d arranged at left and right sides of the main body 101. As the monitoring cameras 104, monocular cameras, wide-area cameras, stereo cameras, etc. can be used.

As shown in FIG. 1, it is also allowed to further provide a pair of rear monitoring cameras 104e, 104f on the rear face. By using monocular cameras as the front monitoring cameras 104a, 104b and rear monitoring cameras 104e, 104f, images of pedestrians, bicycles, motorbikes, people on automobiles, etc. in the surrounding 360° area of the autonomous vehicle 100 can be shot to monitor the surroundings.

A housing unit 106, into which products can be loaded, is provided on the rear side of the main body 101. Products include every item to be delivered such as items purchased at convenience stores and supermarkets including vegetables, clothes, and pharmaceuticals, items to be delivered such as box lunches and beverages, items to be returned such as cleaned or repaired items, and commodities to be delivered to hotels and other facilities as equipment. "commodities," "baggages," "delivery items," and "articles" used in this specification mean all or any one of the above.

FIG. 2 shows the structure of the control circuit of the autonomous vehicle 100 according to the embodiment 1. As shown in FIG. 2, with the autonomous vehicle 100, a speaker 105, a battery 109, a display 110, a memory unit 125, motors 111, etc. as a drive unit 122, and a sensor unit 120 are connected to a CPU 108. The sensor unit 120 includes a monitoring camera 104, an IMU 112, which is a sensor for controlling the traveling state of the autonomous vehicle 100, a monitoring sensor 113, a distance sensor 114, a position sensor 115, a bumper sensor 116 for detecting contact with nearby pedestrians, bicycles, motorbikes, etc., and a state transmitting/receiving unit 133.

The CPU 108 and the memory unit 125 control each of the devices embedded in the autonomous vehicle 100. The CPU 108 can be configured with a microprocessor, microcontroller, etc. The memory unit 125 is configured with DRAM, a nonvolatile memory such as hard disk drive (HDD) and the flash memory etc. The CPU 108 and each device can be connected by using a known method such as controller area network (CAN), for example. Furthermore, a program for operating the autonomous vehicle 100 is stored in a memory medium that can be read by a computer composed of CPU 108 for executing the program, memory unit 125, etc. As the memory medium, CD-ROM, DVD-ROM, USB memory, etc. can be used. The above-mentioned program may be downloaded onto the memory unit 125 of the computer via a network 600.

The battery 109 is the power supply of the autonomous vehicle 100. The battery 109 is connected to the CPU 108. The remaining level of the battery 109 and other information are monitored by the CPU 108.

The display 110 is a component of the display unit 103. In the embodiment 1, predetermined eye-shaped images are displayed on the display unit 103 based on the state of the autonomous vehicle 100 and/or the images shot by the monitoring camera 104. The state of the autonomous vehicle 100 in this case means the state of running on the traveling route such as going straight, turning left, turning right, and stopping, and the image information from the monitoring camera as well as the sensor information concerning the autonomous vehicle 100. The sensor information includes the information from the IMU 112, the monitoring sensor 113, the distance sensor 114, the position sensor 115, the bumper sensor 116, etc. The image information from the monitoring camera and the sensor information concerning the autonomous vehicle 100 are transmitted to the monitoring server 500, which will be described later, by the state transmitting/receiving unit 133 as required.

The display 110 displays the relevant eye-shaped images. Based on luminescence commands from the CPU 108 based on detection signals from the monitoring camera 104, an image of a predetermined pattern is displayed on the display 110. While images are displayed on the display 110, a predetermined sound linked with the image may be output from the speaker 105, which will be described later. Furthermore, based on the state of traveling or stopping of the autonomous vehicle 100, the lights 107 and direction indicators 117 are lit. The lights 107 and the direction indicators 117 are lit by a driver for luminescence not shown according to luminescence commands from the CPU 108.

The motor 111 drives the wheels 102 described above. The drive unit 122 includes the motor 111 and the driver 118 for controlling the operation of the motor 111. Specifically, based on the control signals from the CPU 108, drivers L118a, R118b control motors L111a, R111b respectively, thus driving left and right wheels 120c, 120d.

As mentioned above, the speaker 105, which is installed on the front face of the main body 101 of the autonomous vehicle 100, outputs predetermined voices. The voices may be either the data created by recording the voice of a voice actor or the synthesized sound data.

An IMU 112 stands for an Inertial Measurement Unit. The IMU 112 in the embodiment 1 is the inertial measurement unit that measures the angular velocity and angular acceleration concerning the operation of the autonomous vehicle 100 around roll axis, pitch axis, and yaw axis.

The monitoring sensor 113 detects pedestrians, peoples on bicycles, motorbikes, and automobiles as well as obstacles around the autonomous vehicle 100, in front of the vehicle in particular, and measures the distance with such peoples and obstacles. Specifically, the sensor is used to recognize two- or three-dimensional images of peoples and obstacles as well as their shapes and colors to allow the autonomous vehicle 100 to follow its traveling route. Detecting a pedestrian or obstacle, the monitoring sensor 113 acquires the positional information concerning their positional coordinate, eye height of the person, etc. The display 110 may be controlled based on this positional information. The monitoring sensor 113 may be configured with a module that acquires the positional information using the monocular camera or the stereo camera, the LiDAR, etc. The module can be configured with a CPU or a GPU (graphics processing unit), which processes image data acquired from the monocular or the stereo camera to obtain positional information, and the memory unit, etc. The module using the monocular camera can recognize the shape, color, pattern, and approximate distance from persons or obstacles. The module using the stereo camera is used for measurement of distances, three-dimensional recognition of peoples, automobiles, and obstacles, and recognition of shapes and colors.

The LiDAR, which is also called the laser radar, performs laser imaging detection and ranging. As the LiDAR, a two-dimensional or a three-dimensional LiDARs may be used. The three-dimensional LiDAR can detect laser images of objects in front of the autonomous vehicle 100 and measure the distance from the detected objects, the shape of the detected objects, etc. When the LiDAR is provided, the obstacle in front of the autonomous vehicle 100 and the distance to the obstacle are detected, and the laser image showing the front and the data on distance from the detected object are transmitted as detection signal to the CPU 108, which will be described later, as a detection signal.

Furthermore, the monitoring sensor 113 may be disposed at the upper front part of the autonomous vehicle 100. The monitoring sensor 113 can detect images of pedestrians, persons on a bicycle, motorbike, and automobile, etc. in front of the autonomous vehicle 100 as well as the distance from them in a wide range.

The distance sensor 114, which is placed and looking in the forward direction of the autonomous vehicle 100, measures the distance between the autonomous vehicle 100 and an obstacle, etc., emits ultrasounds or infrared rays toward the obstacle ahead on the traveling route, and detects its reflected waves to measure the distance to the obstacle.

The position sensor 115 acquires the current position of the autonomous vehicle 100. The position sensor 115 in the embodiment 1 uses GNSS receiving unit. It is possible to arbitrarily select whether individual systems should respectively be used for the position sensor 115 and the IMU 112, or a packaged system integrating GNSS receiving function, gyro sensor function, and acceleration sensor function should be used.

The bumper sensor 116 detects contacts with surrounding pedestrians, bicycles, motorbikes, etc. The autonomous traveling of the autonomous vehicle 100 can be suspended or stopped in an emergency when the bumper sensor 116 detects contact with a nearby pedestrian, bicycle, motorbike, etc.

The state transmitting/receiving unit 133 is a communication module such as third-generation (3G), fourth-generation (4G), or wireless LAN communication module that is capable of performing public communication, for example.

In the control circuit of the autonomous vehicle 100 in such a configuration, the CPU 108 controls the drive unit 122 based on detection signals from sensors including the IMU, the monitoring sensor 113, the distance sensor 114, the position sensor 115, the monitoring camera 104, etc. and the map data of cargo delivery route created in advance to ensure autonomous traveling on the route to the delivery destination. The map data is written in HDD, flash memory, etc. of the memory unit 125 in advance.

Figure 3:
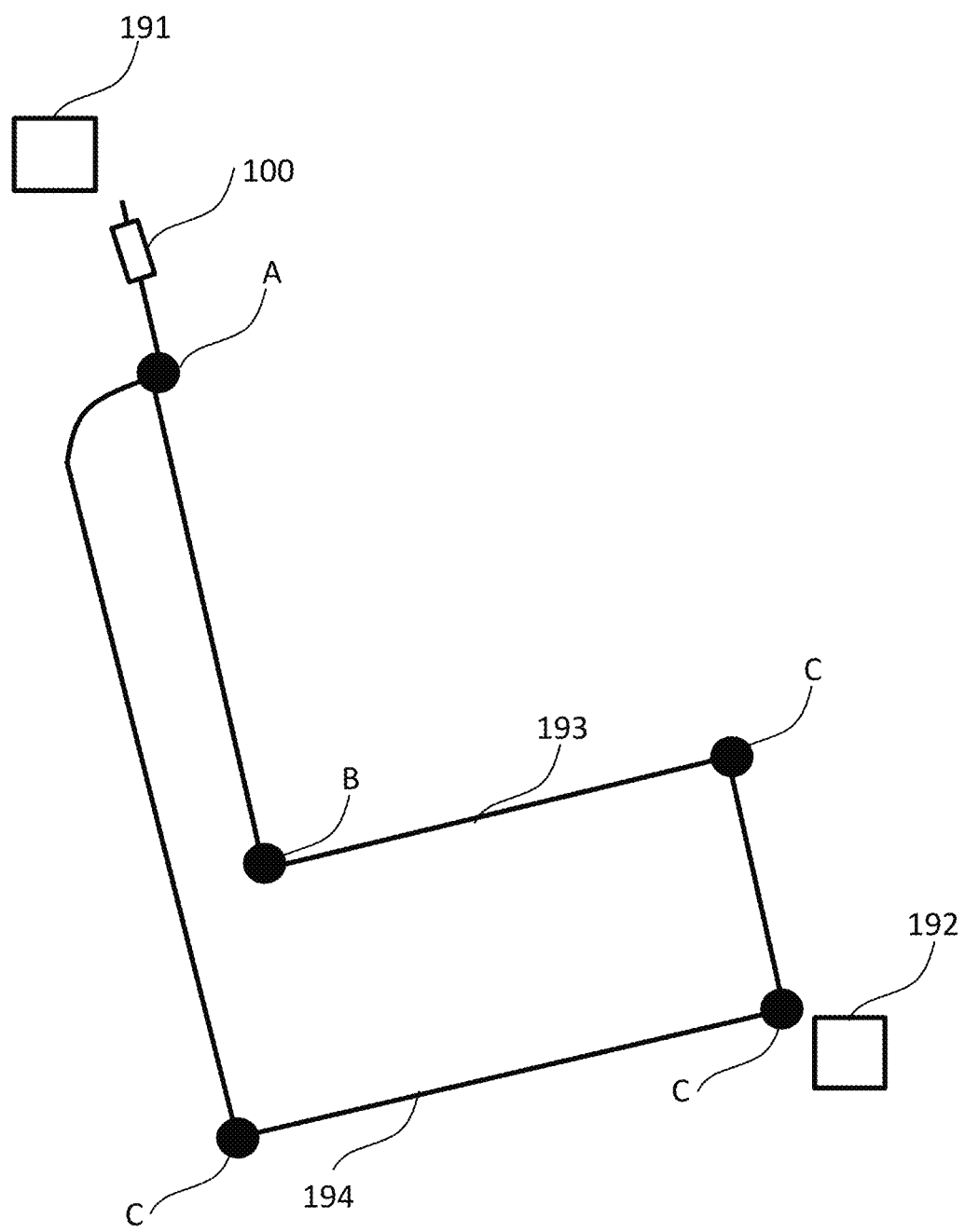
FIG. 3 is a view schematically showing a delivery route of the autonomous vehicle in the embodiment 1.

FIG. 3 schematically shows the traveling route of the autonomous vehicle 100 in the embodiment 1. The traveling route will be described, assuming that it is inside the premises or site of a school, company, or large-scale apartment. The autonomous vehicle 100 autonomously travels along a first traveling route 193 from a store 191 to a delivery destination 192. After the cargo is picked up from the housing unit 106 at the delivery destination 192, the autonomous vehicle 100 autonomously travels back from the delivery destination 192 to the store 191 along a second traveling route 194. On the first traveling route 193 and the second traveling route 194, A is a position where a signal is installed, B is a left-turning point, and C shows right-turning points. The information concerning the first delivery route 193, second delivery route 194, positions where the signal is installed, left-turning point, right-turning points, etc. are written in the memory unit 125 as map data.

In the embodiment 1, the autonomous vehicle 100 uses a battery 109 as a power supply, and is a motorized vehicle that travels by motors 111a, 111b. The motors 111a, 111b respectively drive the rear-left wheel 102c and rear-right wheel 102d of the wheels 102, but which wheel should be used as the drive wheel may be determined arbitrarily.

Figure 4:
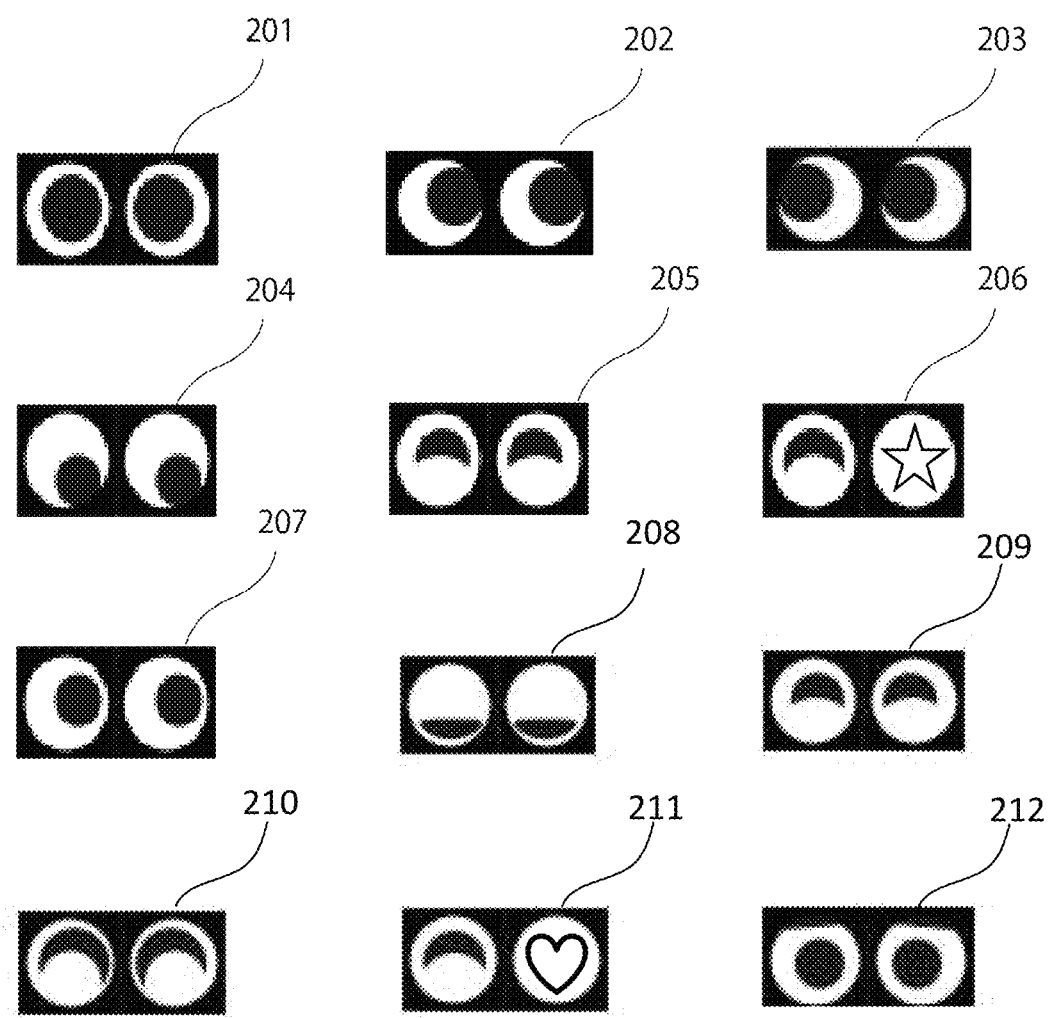
FIG. 4 is a view showing eye-shaped images displayed on the display unit in the embodiment 1.
Figure 5:
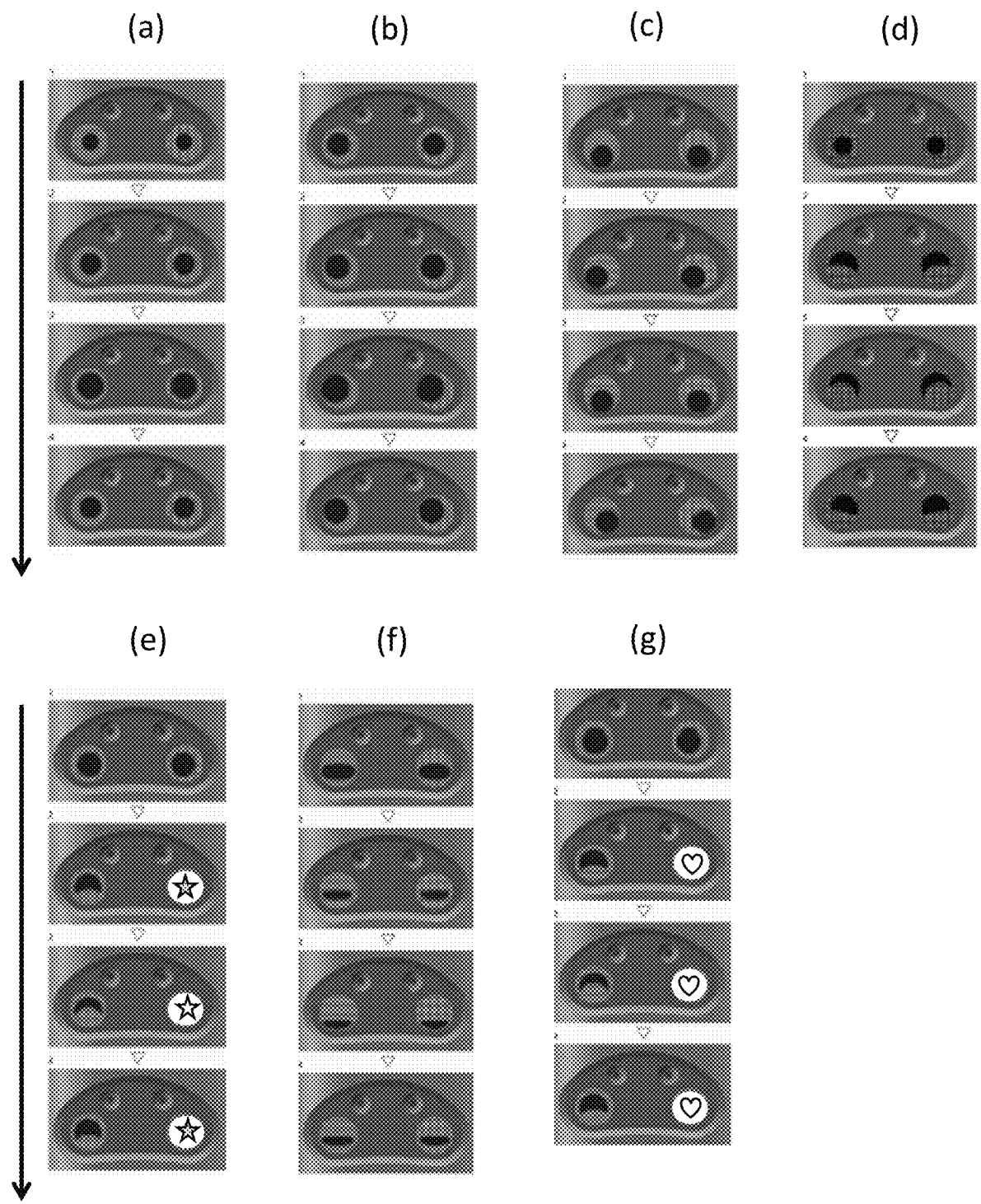
FIG. 5 is a view showing typical changes with time of the eye-shaped images displayed on the display unit in the embodiment 1.

The autonomous vehicle according to the embodiment 1 displays predetermined eye-shaped images on the display unit 103 based on the traveling state of the autonomous vehicle 100 and the images shot by the monitoring camera 104 and/or monitoring sensor 113. FIG. 4 shows eye-shaped images to be displayed on the display unit 103, and FIG. 5 shows typical temporal changes of the eye-shaped images displayed on the display unit 103. As shown in FIG. 4, in the embodiment 1, the autonomous vehicle 100 displays a first eye-shaped image 201 to a twelfth eye-shaped image 212 on the display unit 103 as predetermined eye-shaped images.

Figure 7:
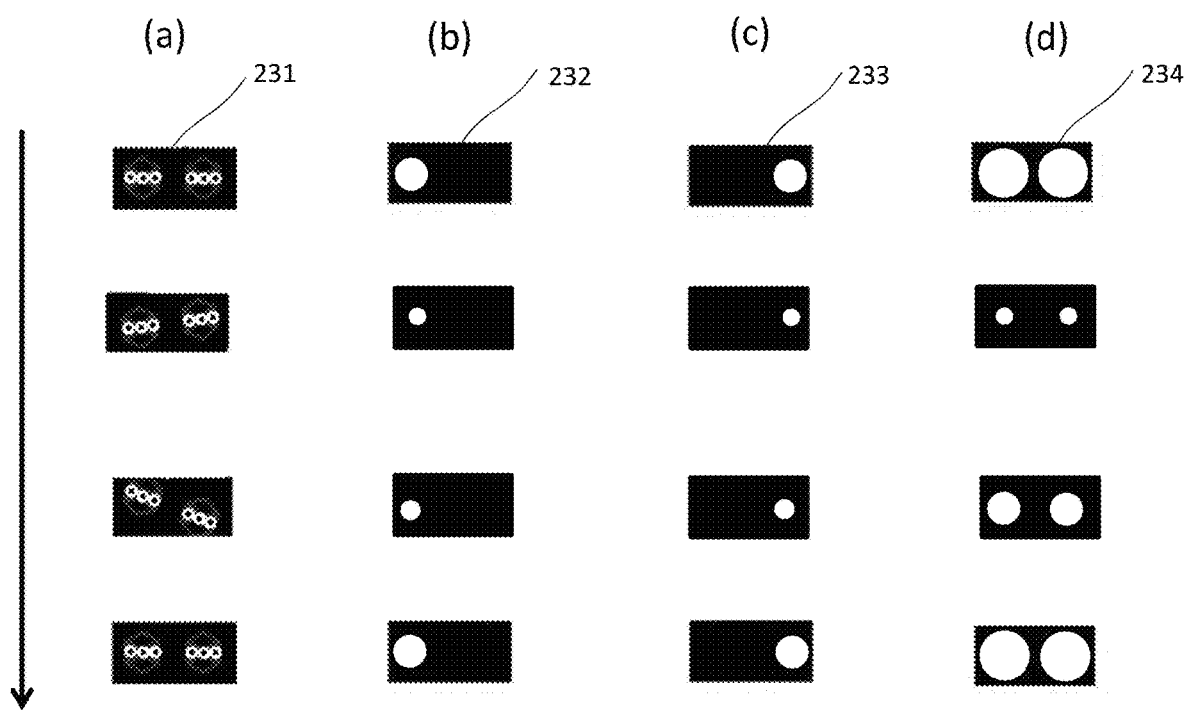
FIG. 7 is a view showing display patterns of the rear light in the embodiment 1.

In the embodiment 1, the autonomous vehicle 100 has a speaker 105 on the front face of the main body 110, and outputs predetermined voices to the speaker 105 based on the state of traveling of the autonomous vehicle 100 and/or the images shot by the monitoring camera 104. With the output of voices, rear lights 107c, 107d may be lit in predetermined patterns. FIG. 6 shows details of voice outputs in the embodiment 1, and FIG. 7 shows display patterns of the rear lights 107c, 107d in the embodiment 1. Eye-shaped images, voice outputs, and display patterns of the autonomous vehicle 100 running along the traveling route as shown in FIG. 3 will hereafter be described.

(Store)

When the autonomous vehicle 100 leaves the store 191, the control circuit of the autonomous vehicle 100 outputs a voice "I am going out for delivery" shown in No. 1 of FIG. 6 and traveling is started. The store includes not only sales outlets such as department stores, supermarkets, and convenience stores but also product collection points such as delivery offices, warehouses, and specified storages. As shown in FIG. 4, when traveling is started, a first eye-shaped image 201 looking ahead in the direction of travel of the autonomous vehicle 100 is shown. As shown in FIG. 5(a), with the elapse of time from top down, the size of the black eyes of the first eye-shaped image 201 (top) at the center increases and then returns back to the original size. The control circuit judges the state of the autonomous vehicle 100 and/or the situation of the autonomous vehicle 100 facing forward and going straight based on the images shot by the monitoring camera 104, and then the control circuit controls to display the first eye-shaped image 201 on the display 110. The temporal change of the first eye-shaped image 201 in FIG. 5(a) may be repeated at predetermined time intervals. In that case, since the autonomous vehicle 100 is traveling straight along the first traveling route 193, the rear lights 107c, 107d display a first rear light pattern 231, which shows the logo of the manufacturer of the autonomous vehicle 100, as shown in FIG. 7(a).

In the first rear light pattern 231, the arrow mark (→) shows the change with time of the display: the logo shown horizontally, slanting to the left, and then slanting to the right. The change with time of the first rear light pattern 231 may be repeated at predetermined time intervals.

(Turning Left and Turning Right)

At the left-turn position B (FIG. 3), the control circuit of the autonomous vehicle 100 controls the display 110 so that a second eye-shaped image 202 is displayed. Specifically, the second eye-shaped image 202 displays the eyes looking to the left of the autonomous vehicle 100. In the embodiment 1, when the autonomous vehicle 100 turns left, the second eye-shaped image 202 is displayed on the display unit 103. At the time of left turn, the timing of starting displaying the second eye-shaped image 202 may be selected arbitrarily. For example, the second eye-shaped image 202 may be displayed predetermined time before the autonomous vehicle 100 reaches the point where left turn is started, or before predetermined distance from the relevant point. At the time of left turn, a voice "I am turning left" (No. 11 of FIG. 6) is output, and the rear lights 107c, 107d display a second rear light pattern 232 showing left turn as shown in FIG. 7(b). The second rear light pattern 232 shows that the direction of the arrow (→) indicates change with time of the display so that the size of the orange circle increases or decreases, for example. The change with time of the second rear light pattern 232 may be repeated at predetermined time intervals.

The control circuit of the autonomous vehicle 100 controls the display 110 at the right-turn positions C (FIG. 3) so that a third eye-shaped image 203 is displayed. The third eye-shaped image 203 displays the eyes looking to the right of the autonomous vehicle 100. In the embodiment 1, when the autonomous vehicle 100 turns right, the third eye-shaped image 203 is displayed on the display unit 103. As shown in FIG. 5(b), with the elapse of time shown from top down, the third eye-shaped image 203 changes from the first state (top) where the black eyes are at the center to a state where the eyes look to the right, prompting pedestrians in front of the autonomous vehicle 100 that the autonomous vehicle 100 is turning right. In the same way as FIG. 5(a), the change with time of the eye-shaped image may be repeated at predetermined time intervals. As in the case of left turn, the timing of starting displaying the eye-shaped image 203 at the time of right turn can be selected arbitrarily. The third eye-shaped image can be displayed predetermined time before the autonomous vehicle 100 reaches the point where the autonomous vehicle 100 actually starts turning right, or predetermined distance before the relevant point, for example. When turning right, a voice "I am turning right" (No. 10 of FIG. 6) is output, and as shown in FIG. 7(c), the rear lights 107c, 107d display a third rear light pattern 233. With the third rear light pattern, the arrow (→) shows the change with time of the display so that the size of the orange circle increasing or decreasing, for example. The change with time of the third rear light pattern 233 may be repeated at predetermined time intervals.

(Suspending Traveling)

The control circuit of the autonomous vehicle 100 controls the display 110 so that a fourth eye-shaped image 204 is displayed when a person or an obstacle is detected and traveling is suspended. The fourth eye-shaped image 204 shows a hesitant motion to be displayed when the autonomous vehicle 100 has stopped traveling, detecting a person or an obstacle. As shown in FIG. 5(c), with the elapse of time from top down, the fourth eye-shaped image 204 changes from the first state (top) where the black eyes are at the center to look down, thus prompting pedestrians in front of the autonomous vehicle 100 that the autonomous vehicle 100 is suspending traveling. As in the case of FIG. 5(a), the change with time of the eye-shaped image may be repeated at predetermined time intervals. In the embodiment 1, the autonomous vehicle 100 shoots images of the front and sides of the autonomous vehicle 100 using a monitoring camera 104. The shot images are analyzed by the CPU 108, and when a person or an obstacle is detected in the direction of travel as the result of analysis, the traveling of the autonomous vehicle 100 is suspended, and in that case, the fourth eye-shaped image 204 is displayed on the display unit 103. When traveling is suspended, detecting a person or an obstacle, a voice "I apologize for the inconvenience. Please be careful." (No. 12 of FIG. 6) or "Will you please give way?" (No. 8 of FIG. 6) is output, and the rear lights 107c, 107d display the first rear light pattern 231 as shown in FIG. 7(a).

(Greeting)

Detecting a person, the control circuit of the autonomous vehicle 100 controls the display 110 so that a fifth eye-shaped image 205 is displayed. The fifth eye-shaped image 205 is shown as a greeting when the autonomous vehicle 100 detects a person. As shown in FIG. 5(d), with the elapse of time from top down, the first state (top) where the black eyes are at the enter changes to a state where their shape becomes a semi-circular form. As in the case of FIG. 5(a), the change with time of the eye-shaped image may be repeated at predetermined time intervals. As described above, the autonomous vehicle 100 monitors its front and sides using the monitoring cameras 104 to detect persons and obstacles. Meanwhile, when the person is detected at places outside the direction of travel of the autonomous vehicle 100, the traveling is not suspended, and the fifth eye-shaped images 205 is displayed on the display unit 103. When the person is detected, a voice "I am CarriRo Deli (registered trade mark) of ///// (delivery company)." (No. 5 of FIG. 6) or "I am going out for delivery." (No. 7 of FIG. 6) is output, and the rear lights 107c, 107d display the first rear light pattern 231.

(Eye-Shaped Image Displayed when Passing Pedestrians)

Figure 8:
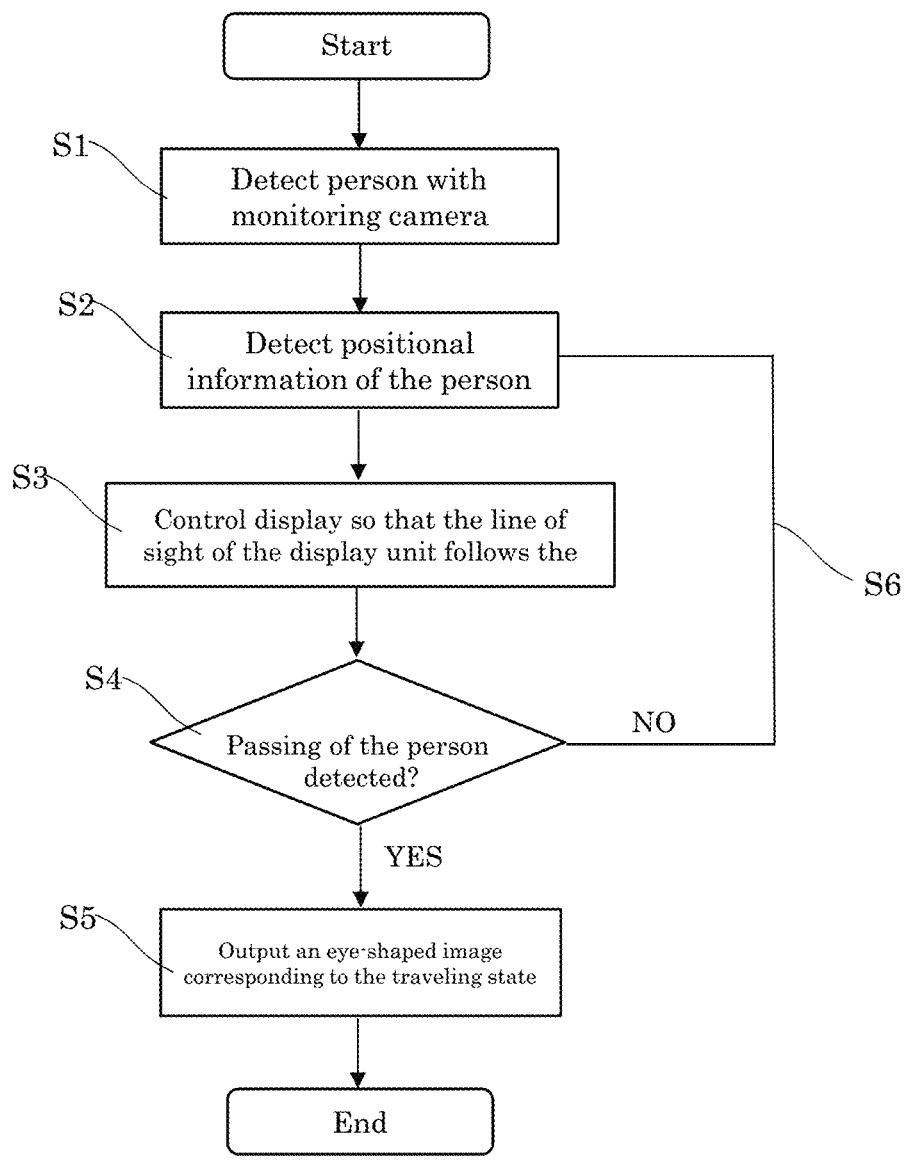
FIG. 8 is a flow chart showing the processing of the control unit when the line of sight of the eye-shaped image of the autonomous vehicle is changed when the vehicle passes a pedestrian.

When passing a person, the control circuit of the autonomous vehicle 100 may allow the eye-shaped image to look at the pedestrian, greeting with a smile while changing its line of sight. FIG. 8 is a flow chart showing the processing of the control unit in the embodiment 1 when the line of sight of the eye-shaped image of the autonomous vehicle 100 is changed.

First, the monitoring sensor 113 capable of measuring the distance detects a person (step S1). In this case, the person means a pedestrian or a person on a bicycle, motorbike, or automobile around the autonomous vehicle 100, in front of it in particular.

Then the monitoring sensor 113 detects the positional information concerning the coordinate and the height of the eyes of the person (step S2). When the stereo camera or the three-dimensional LiDAR is used as the monitoring sensor 113, the accurate positional information including the distance from and the orientation of the person can be acquired. When the monocular camera is used as the monitoring sensor 113, the accurate distance cannot be acquired, but the approximate positional information can be detected.

The display 110 is controlled so that the line of sight of the display unit 103 follows the person with respect to the coordinate showing the positional information of the person acquired in step S2 (step S3). In step S3, the display 110 is controlled so that the eye-shaped image changes in accordance with the height and position of the eyes of the passing person by using the positional information concerning the height of the person's eyes obtained by the monitoring sensor 113.

Whether a person has passed the vehicle or not is detected by the monitoring sensor 113 or the distance sensor 114 (step S4). For example, it is detected based on the positional information including the distance from and direction of the person obtained by the monitoring sensor 113. When the person has passed the vehicle in step S4, the display 110 is controlled so that the line of sight of the display unit 103 stops following the person, and the eye-shaped image that fits the traveling condition is output, completing the control of changing the line of sight (step S5). When the person has not passed the vehicle in step S4, the operation returns to step 2 so that the line of sight of the display unit 103 follows the person (step S6). According to the above-mentioned processing by the control unit, since the vehicle can change its line of sight to look at and greet pedestrians with a smile while passing them, a friendly autonomous vehicle 100 that hardly causes interference when passing persons can be provided.

(When a Person Gives Way)

Detecting that a person has given way to the vehicle, the control circuit of the autonomous vehicle 100 controls the display 110 so that a sixth eye-shaped image 206 is displayed. The sixth eye-shaped image 206 is displayed on the display unit 103 to show gratitude when the autonomous vehicle 100 stops traveling by detecting a person and the person gives way to the autonomous vehicle 100. As shown in FIG. 5 (e), with the elapse of time from top down, the sixth eye-shaped image 206 changes from the first state (top) where the black eyes are at the center to a state where the right eye changes to a semicircular shape, and at the same time, the left eye changes to a star shape of a color other than black for example. As in the case of FIG. 5(a), the change with time of the eye-shaped image may be repeated at predetermined time intervals. As described previously, the autonomous vehicle 100 shoots images of its front and sides using the monitoring camera 104, and stops traveling when detecting the person or the obstacle in the direction of its travel. When the target of detection is the person, and detecting that the person gives way to the autonomous vehicle 100, the autonomous vehicle 100 resumes traveling, and at the same time displays the sixth eye-shaped image 206 on the display unit 103. Detecting that the person has given way, a voice "Thank you very much." (No. 9 of FIG. 6) is output to show appreciation, and the rear lights 107c, 107d display the first rear light pattern 231 shown in FIG. 7(a).

(When Arriving at the Delivery Destination)

When the vehicle arrives at the delivery destination 192, the control circuit of the autonomous vehicle 100 controls the display 110 so that a seventh eye-shaped image 207 is displayed. The seventh eye-shaped image 207 is displayed when items are loaded onto or unloaded from the housing unit 106 of the autonomous vehicle 100.

When the autonomous vehicle 100 arrives at the delivery destination 192, the voice such as "Thank you for waiting." (No. 13 of FIG. 6) or "I have come to deliver the item you ordered." (No. 14 of FIG. 6) is output. Then, to check the orderer waiting at the delivery destination 192, a voice "Hold up your smartphone to the camera on the side." (No. 15 of FIG. 6) is output to obtain authentication of the order by QR code (registered trademark). Furthermore, once the control circuit has succeeded in authentication by the QR code (registered trademark), a voice "Open the locker and take out the product." (No. 16 of FIG. 6) is output to allow the orderer to take out the ordered product. In this case, the locker means the housing unit 106 shown in FIG. 1. The description below uses the word "locker."

Then, when it is confirmed by the side monitoring cameras 104c, 104d that the orderer has taken out the product, a voice "Now that the product has been taken out, please close the locker." (No 17 of FIG. 6) is output. If the locker is not closed, the voice "Will you please close the locker?" (No. 18 of FIG. 6) may be output. Opening/closing of the locker may be performed automatically by the control of the autonomous vehicle 100 and not by the person who receives the product. Confirming that the orderer has closed the locker by the side monitoring cameras 104c, 104d, a voice "Thank you for using the service. We look forward to serving you again." (No. 19 of FIG. 6) is output, completing the delivery. At the time of this delivery, the rear lights 107c, 107d display the first rear light pattern 231 shown in FIG. 7(a).

(Stopping at Signals)

When the autonomous vehicle 100 stops traveling at a signal, the control circuit of the autonomous vehicle 100 controls the display 110 so that an eighth eye-shaped image 208 is displayed. The eighth eye-shaped image 208 is displayed on the display unit 103 when the autonomous vehicle 100 stops in front of the signal. As shown in FIG. 5(f), with the elapse of time from top down, the eighth eye-shaped image 208 changes from the first state (top) where the black eyes are at the center to a state where the eyes become narrow, moving downward, thus prompting pedestrians that the autonomous vehicle 100 is stopping at the signal. As in the case of FIG. 5(a), the change with time may be repeated at predetermined time intervals.

When the vehicle stops at the signal, a voice "I am waiting at the red signal." (No. 6 of FIG. 6) or "I am waiting. Sorry for the inconvenience." (No. 28 of FIG. 6) is output, and the rear lights 107c, 107d display a fourth rear light pattern 234, which indicates stopping as shown in FIG. 7(d). With the fourth rear light pattern 234, the arrow (→) shows change with time of the display, with the red circles at right and left increasing or decreasing, for example. The change of the fourth rear light pattern 234 with time may be repeated at predetermined time intervals.

A ninth 209 to a twelfth 212 eye-shaped images show the operations of the autonomous vehicle 100.

The ninth eye-shaped image 209 shows a state of modest happiness as an operation of the autonomous vehicle 100, an image showing the expression when the autonomous vehicle 100 leaves a store 191 for a delivery destination 192, for example. When leaving for the delivery destination 192, a voice "Hello." (No. 2 of FIG. 6), "Good morning." (No. 3 of FIG. 6), or "Good evening." (No. 3 of FIG. 6) is output as a greeting to the staff of the store 191, and the rear lights 107c, 107d display the first rear light pattern 231.

The tenth eye-shaped image 210 displays a state of happiness as the operation of the autonomous vehicle 100, an expression displayed when the autonomous vehicle 100 has delivered a product to the delivery destination 192 and the product has been taken out of the housing unit 106, for example. As a greeting to the staff of the store 191 before leaving for the delivery destination 192, a voice "Hello." (No. 2 of FIG. 6), "Good morning." (No. 3 of FIG. 6), or "Good evening." (No. 3 of FIG. 6) is output, and the rear lights 107c, 107d display the first rear light pattern 231.

An eleventh eye-shaped image 211 displays a shape of eyes showing gratitude as the operation of the autonomous vehicle 100, an expression displayed, as in the case of the tenth eye-shaped image 210, when the autonomous vehicle 100 has delivered a product to a delivery destination 192 and the product has been taken out of the housing unit 106. As shown in FIG. 5(g), with the elapse of time from top down, the eleventh eye-shaped image 211 changes from the first state (top) where the black eyes are at the center to a state where the right eye becomes narrow to form a semi-circular shape, narrower, and then back again to a semi-circular shape. At the same time, the left eye changes to a shape of heart in a color different from black (pink, for example). The change of the eye-shaped image with time may be repeated at predetermined time intervals as same as in the case of FIG. 5(a). For example, when the locker is confirmed to have been closed by the orderer by the side monitoring cameras 104c, 104d, a voice "Thank you for using our service. We look forward to serving you again." (No. 19 of FIG. 6) may be output, and the rear lights 107c 107d may display the first rear light pattern 231.

(When Returning to a Store)

A twelfth eye-shaped image 212 displays a sleepy state as the operation of the autonomous vehicle 100, an expression displayed when the autonomous vehicle 100 has completed delivery and returned to the store 191, for example. When the autonomous vehicle 100 was confirmed to have completed delivery and returned to the store 191 along the second traveling route 194, a voice "I have just returned." (No. 27 of FIG. 6), "Thank you for your hard work for today." (No. 29 of FIG. 6), or "I look forward to working with you tomorrow." (No. 30 of FIG. 6) is output as a greeting to the staff of the store 191, and the rear lights 107c, 107d display the first rear light pattern 231.

In the embodiment 1, the first eye-shaped image 201 to the twelfth eye-shaped image 212 are displayed on the display unit 103 based on the state of the autonomous vehicle 100 and/or the images shot by the monitoring camera 104. The shape of the eye-shaped images is allowed to change with time. As described by referring to FIG. 5, in particular, by changing the eye-shaped image with time, more specifically, by flexibly and dynamically changing the size and moving back and forth or left and right, or when passing a person, by changing the line of sight of the eye-shaped image to follow the line of sight of that person (FIG. 8), lively eye expressions are allowed. The eye contact with persons and mutual communication (interaction) can thus be achieved, producing the effect of allowing people to feel familiar with the autonomous vehicle 100. Specific details of the eye-shaped image and conditions for displaying the eye-shaped image can be selected arbitrarily. For example, when the autonomous vehicle 100 is started or shut down, arbitrary eye shapes may be displayed.

In the embodiment described above, the display unit 103 is arranged on the front face of the main body 101 of the autonomous vehicle 100. A left and right pair may be additionally provided on the rear face of the main body 101. The display units installed on the rear face of the main body 101 also display images on the display according to luminescence commands from the CPU 108 based on the detection signals from the monitoring camera 104 as in the case of the display unit 103 installed on the front, allowing persons at the back of the autonomous vehicle 100 as well to achieve eye contact with the autonomous vehicle 100. Similar display units may also be installed either on left or right side, or on both sides, of the main body 101 as required or on request.

In the embodiment 1, when displaying the first eye-shaped image 201 to the twelfth eye-shaped image 212 described above on the display unit 103, the above-mentioned sound messages may be modified as required depending on delivery situations, and output to the speaker 105. In other words, in the embodiment 1, predetermined eye-shaped images are displayed on the display unit 103 based on the state of travel of the autonomous vehicle 100 and/or the images shot by the monitoring camera 104, and at the same time predetermined voices are output from the speaker 105. This configuration may be modified as required depending on persons and obstacles met during traveling.

(Questionnaire Survey)

As voice outputs, questions about the delivery service may be asked to orderer. In that case, a voice "Will you please assess our service?" (No. 20 of FIG. 6) is output to the orderer, and then as the quality of service, voices "Five stars," "Four stars," "Three stars," "Two stars," and "One star" (Nos. 21 to 26 of FIG. 6) are output. Recognizing the voice input of the reply by the orderer from the microphone, a confirmation message such as "Thank you very much for your reply, N stars (N: any one of 1 to 5)" (No. 26 of FIG. 6) may be output. At that time, the rear lights 107*c*, 107*d* display the first rear light pattern 231.

The microphone for detecting the voice of the orderer is installed at the front or side faces of the main body 101. The microphone is a sensor additionally installed to the above-mentioned sensor unit 120, and is connected to the CPU 108 via an interface circuit such as the amplifier and the AD converter. Since the questions for the survey are output by sound in advance and the reply from the orderers is limited, thus replies can be recognized by a program having relatively small number of steps. Also, the recognition of the voices of orderers and pedestrians and the sound synthesis of replies may be performed by the control unit of the autonomous vehicle 100. For voice recognition and replies, a mechanical learning method based on deep learning by so-called artificial intelligence (AI) can be used, and the CPU 108, the graphics processing unit (GPU), and the memory unit can be used for execution.

As described above, according to the autonomous vehicle 100 based on the embodiment 1, the first eye-shaped image 201 to the twelfth eye-shaped image 212 are displayed as predetermined eye-shaped images on the display unit 103 based on the state of travel of the autonomous vehicle 100 and/or the images shot by the monitoring camera 104, and at the same time appropriate voices can be output to the staff of stores 191, moving bodies including pedestrians and orderers. Thus, it is possible to provide the autonomous vehicle 100 that is easy to get to know friendly and hardly interferes with moving bodies including pedestrians and obstacles by changing the eye-shaped image and voice output according to the traveling direction of the autonomous vehicle 100 as a delivery robot and the situation of people nearby, orderers, and obstacles.

Embodiment 2

A delivery system according to an embodiment 2 will be described.

Figure 9:
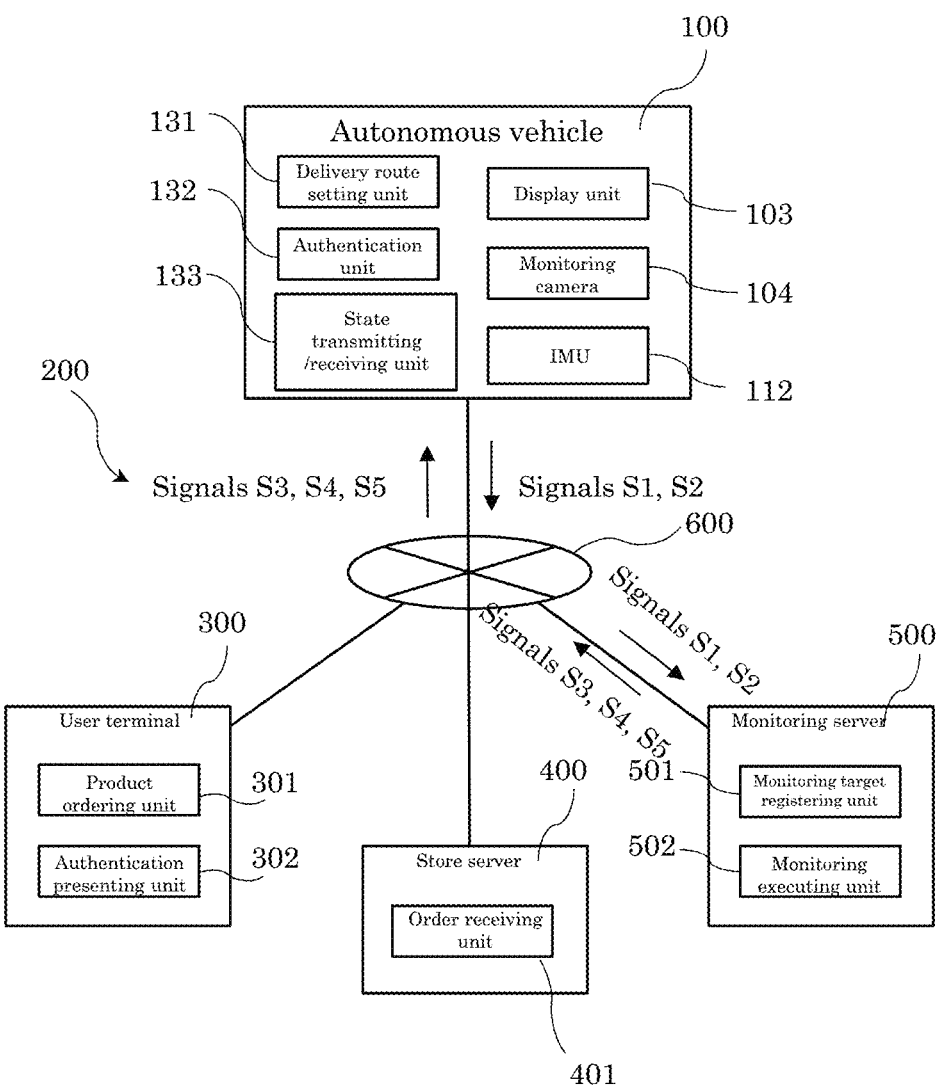
FIG. 9 is a chart showing the structure of a delivery system according to the embodiment 2 of the present invention.

FIG. 9 shows the structure of a delivery system 200 according to the embodiment 2. As shown in FIG. 9, with the delivery system 200, the autonomous vehicle 100, a user terminal 300, a store server 400, and a monitoring server 500 are connected to a network 600.

The mechanical structure of the autonomous vehicle 100 is the same as that in the embodiment 1. In the embodiment 2, however, the following are further provided: a delivery route setting unit 131 for setting a route of delivery of products to users, an authentication unit 132 for authenticating users by using the user terminal 300, which will be described later, and a state transmitting/receiving unit 133 for transmitting the state of the autonomous vehicle 100 to and receiving control signals from the monitoring server 500, which will be described later.

The delivery route setting unit 131 sets a route of travel of the autonomous vehicle 100 in the autonomous vehicle 100. The delivery route setting unit 131 is allowed to set a delivery route from the store server 400 via the network 600, or via CD-ROM, USB memory, and other recording media as describe later.

The authentication unit 132 authenticates users who have ordered products. As described later, in the embodiment 2, the user terminal 300 has an authentication presenting unit 302, and an authentication code is displayed on a display unit of the user terminal 300. The authentication unit 132 shoots the displayed authentication code using the monitoring camera 104, and authenticates users based on the authentication code that has been shot. If the authentication is successful, the autonomous vehicle 100 unlocks the door (not shown) of the housing unit 106, allowing the user to take out the product from the housing unit 106. The housing unit 106 of the autonomous vehicle 100 may have one or more spaces for housing products and doors for loading and taking out products. Also, the above spaces or doors may be linked to each order. In his case, the autonomous vehicle 100 can deliver two or more products at the same time. In addition, since only the authenticated user can take out the ordered product, higher safety of the delivery system can be ensured.

The state transmitting/receiving unit 133 transmits the image information concerning the state of the autonomous vehicle 100 as well as the sensor information to the monitoring server 500, which will be described later, as required, and transmits the state of the autonomous vehicle 100 to the monitoring server 500 in response to a request from the monitoring executing unit 502 of the monitoring server 500. The details of transmission may be selected arbitrarily. For example, communication according to the On Board Diagnosis Second Generation (OBD2) may be allowed via the network 600 between the monitoring server 500 and the autonomous vehicle 100.

The user terminal 300 is used by users of the delivery system 200. As the user terminal 300, known computers such as smartphones and tablet computers owned by users, for example, are used. It is also allowed for the function of the ordering unit 301 and that of the authentication presenting unit 302, which will be described later, to be stored as a program, thus allowing the computer to operate as the user terminal 300 by executing the program. This program is stored by being recorded in a recording medium readable by the computer to which the program is stored. The information may be read into the computer using recording media such as CD-ROM, USB memory, and others, or via the network 600.

The user terminal 300 has the product ordering unit 301 for placing an order for a product to be delivered to the store server 400, which will be described later, and the authentication presenting unit 302 for authenticating users by the authentication unit 132 of the autonomous vehicle 100. The ordering unit 301 is operated by the user to place the order for the desired product to be delivered by the autonomous vehicle 100. Specifically, the order information, which includes the product information identifying the product, the delivery destination information identifying the delivery destination, and the orderer information identifying the orderer, is transmitted to the store server 400. The authentication presenting unit 302 presents the information necessary for user authentication by the authentication unit 132 of the autonomous vehicle 100 when the user receives the product delivered by the autonomous vehicle 100. In the embodiment 2, the authentication presenting unit 302 displays a specified authentication code to a display unit such as the display of the user terminal 300, thus presenting the authentication information to the autonomous vehicle 100. As the authentication code, known encryption technologies etc. may be used. The QR code (registered trademark), etc. may be used, for example, to present the authentication code.

The store server 400 is a system used by a store that delivers products to receive orders from the user terminal 300 and give delivery instructions to the autonomous vehicle 100. The store server 400 can be configured by using computers used as servers or other known computers. It is allowed to configure the store server 400 by using a computer, or two or more computers. When the store server 400 is configured by one computer, since it is necessary for the store owner or workers to operate the computer, the computer is assumed to be installed in the store or its warehouse, etc. where products are stored. When the store server 400 is configured by two or more computers, it is allowed for a part of the server to be installed in remote areas such as data center. As in the case of the user terminal 300, the function of the order receiving unit 401, which will be described later, is recorded in the store server 400 in advance as a program, and by executing the program, the computer can be made to operate as the store server 400. The program for operating the store server 400 is recorded and stored in a recording medium readable by a computer that stores the program. The memory media such as CD-ROM and USB memory may be used, or the program may be read by the computer via the network 600.

The store server 400 has the order receiving unit 401 for receiving orders from the user terminal 300. The order receiving unit 401 receives the order information transmitted by the above-mentioned product ordering unit 301, and sends the acknowledgment of the order to the user terminal 300 that the order has been received.

The monitoring server 500 is a system for monitoring the state of the autonomous vehicle 100. In the embodiment 2, the monitoring server 500 includes a monitoring target registering unit 501 and a monitoring executing unit 502. The monitoring server 500 may be configured by using a computer for server application and other known computers. Also, as in the case of the store server 400, the monitoring server 500 may be configured by one or more computers. It is also allowed that by registering the monitoring target registering unit 501 and the monitoring executing unit 502, which are the functions of the monitoring server 500, as a program in advance, and by executing the program, the computer is made to operate as the monitoring server 500. The monitoring server 500 is not an essential component of the delivery system 200, so that it need not be provided when there is no need to monitor the autonomous vehicle 100. In that case, the state transmitting/receiving unit 133 can be omitted from the configuration of the autonomous vehicle 100.

The monitoring target registering unit 501 registers autonomous vehicles 100 to be monitored in the monitoring server 500. The state of the registered autonomous vehicles 100 is periodically monitored by the monitoring executing unit 502, which will be described later. If monitoring reveals any abnormalities, etc. of the autonomous vehicle 100, or when periodic maintenance is judged to be necessary, this information is noticed to the manager in charge of the autonomous vehicle 100 and other specified responsible persons.

The network 600 is a computer network to which the autonomous vehicles 100, the user terminal 300, the store server 400, and the monitoring server 500 are connected. The network 600 may be a known computer network, or wide area network such as the Internet, third-generation (3G) or fourth-generation (4G) mobile phone network, locally established Local Area Network (LAN), etc. are also allowed.

(Monitoring the Autonomous Vehicle 100)

The IMU 112 detects cases where the autonomous vehicle 100 is played a prank, hit, or kicked, and the signal S1 is transmitted from the state transmitting/receiving unit 133 to the monitoring server 500 via the network 600. To the monitoring server 500, the signal S2 is also transmitted at the same time from the monitoring camera 104 or the monitoring sensor 113 of the autonomous vehicle 100. The monitoring executing unit 502 judges that a trouble is occurring to the autonomous vehicle 100 based on signals S1 and S2, transmits signal S3 for issuing alarm sound to the autonomous vehicle 100, remotely controls the autonomous vehicle 100, and outputs a voice "The autonomous vehicle is monitored by TV telephone. Please move away from the vehicle. The image is recorded." from the speaker 105 of the autonomous vehicle 100. After the above-mentioned alarm sound of the signal S3 is output, the signal S1 from the IMU 112 and the signal S2 from the monitoring camera 104 are monitored to judge whether the trouble has been resolved. If the trouble has been resolved, the output of the alarm sound is stopped.

If the IMU 112 detects a change such as the door of the locker being tried to be opened or the entire autonomous vehicle 100 being tried to be stolen, and the trouble has not been resolved, the monitoring executing unit 502 judges that stealing will occur, transmits the signal S3 again to the autonomous vehicle 100, outputs alarm sound at the maximum volume, and transmits the signal S4 so as to output a brave-looking eye-shaped image to the display unit 103 to prevent stealing, thus remotely operating the autonomous vehicle 100. If the trouble has not been resolved, the nearest contract security company is informed of the trouble and asked to resolve the trouble. In this case, if the autonomous vehicle 100 must be moved, the signal S5 for remote operation may be transmitted to the autonomous vehicle 100 to remotely operate the autonomous vehicle 100. The autonomous vehicle 100 may be remotely operated to allow the monitoring server 500 to output a voice "I am on patrol." on the traveling route as required as deterring force against troubles during patrol to ensure security.

Figure 10:
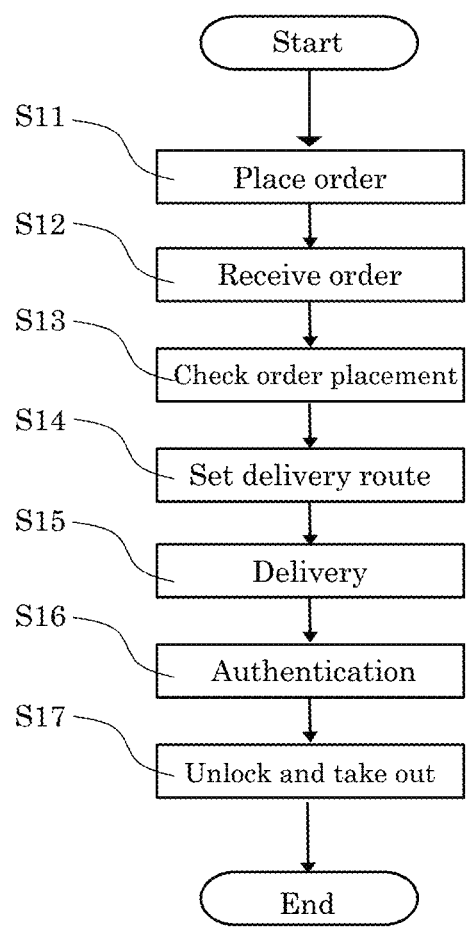
FIG. 10 is a flow chart showing the flow of delivery in the embodiment 2 of the present invention.

FIG. 10 is a flow chart showing the flow of the delivery system 200 that uses the autonomous vehicle 100 according to this embodiment from order placement of the product to its receiving.

After the user places an order for the product by using the user terminal 300, the ordering unit 301 of the user terminal 300 generates the product information showing the product ordered by the ordering unit 301 of the user terminal 300, the user authentication information for authenticating the user having placed the order, and the order information including delivery destination showing the place where the user receives the product, and the ordering unit 301 transmits these information to the store server 400 (step S11).

After the store server 400 receives the order information transmitted by the ordering unit 301 of the user terminal 300, the ordering unit 401 of the store server 400 performs order receiving processing based on the received information (step S12). When the order receiving processing is completed, the acknowledgment of the order is transmitted to the user terminal 300 of having received the order (step S13). The details of order receiving processing can be selected arbitrarily; the database for order management may be established in the store server 400 and the order information may be registered in the database, for example.

Once steps S2 and S3 are completed, the store delivery staff member in charge loads the product on the housing unit 106 of the autonomous vehicle 100, and sets the route toward the delivery destination by using the delivery route setting unit 131 of the autonomous vehicle 100 (step S14). The autonomous vehicle 100 travels along the set route, namely the route leading to the delivery destination of the product, to deliver the product loaded onto the housing unit 106 (step S15). Once the autonomous vehicle 100 has delivered the product to the user, the user operates the user terminal 300 to display the authentication code by using the authentication presenting unit 302 on the display unit of the user terminal 300. The authentication code is shot by the monitoring camera 104 of the autonomous vehicle 100, and the authentication is performed by the authentication unit 132 of the autonomous vehicle 100 based on the shot authentication code (step S16). Once the authentication by the authentication unit 132 is completed successfully, the autonomous vehicle 100 unlocks the key for the door of the housing unit 106. The user then takes the product out of the housing unit 106 (step S17), thus completing delivery.

The delivery flow in the embodiment 2 has been described. In the delivery processing, the autonomous vehicle 100 displays the first eye-shaped image 201 to the seventh eye-shaped image 207 on the display unit 103 as predetermined eye-shaped images based on the state of the autonomous vehicle 100 and/or the images shot by the monitoring camera 104. By changing the eye-shaped image depending on the direction of travel of the autonomous vehicle 100 and conditions of nearby people and obstacles, and changing the image when the product is loaded and the user takes out the product, a friendly autonomous vehicle 100 can be provided.

The present invention is not limited to embodiments 1 and 2 described above, but can be modified without departing from the scope of the invention.

For example, in the embodiment described above, the display 110 of the display unit 103 of the autonomous vehicle 100 may be made into a color display for characterization by color. It is apparent that the first eye-shaped image 201 to the twelfth eye-shaped image 212 can be changed for each scene of communication with the staff of the store 191, moving bodies including pedestrians, and users including orderers.

For example, the colors showing characters may be set as follows:
  Red: a hero who is a hot-blooded leader of everyone who has strong sense of justice
  Silver: a cool and intelligent person
  Yellow: a cute and bright mood maker
  Metallic blue: a slightly annoying handsome person Furthermore, in the above-mentioned embodiment, the control circuit of the autonomous vehicle 100 allowed the display unit 103 to make greetings with a smile while changing its line of sight when passing a pedestrian. However, it is apparent that the control of changing the line of sight can also be applied so as to follow the line of slight of the questionee of a questionnaire survey.

REFERENCE SIGN LIST

100 Autonomous vehicle
101 Main body
102 Wheel
103 Display unit
104 Monitoring camera
105 Speaker
106 Housing unit
107 Light
107a, 107b Front light
107c, 107d Rear light
108 CPU
109 Battery
110 Display
111 Motor
112 Inertial Measuring Unit (IMU)
113 Monitoring sensor
114 Distance sensor
115 Position sensor
116 Bumper sensor
117 Direction indicator
118 Driver
120 Sensor unit
122 Drive nit
125 Memory unit
131 Route setting unit
132 Authentication unit
133 State transmitting/receiving unit
191 Store
192 Delivery destination
193 First traveling route
194 Second traveling route
200 Delivery system
201-212 First eye-shaped image to twelfth eye-shaped image
231 First rear light pattern
232 Second rear light pattern
233 Third rear light pattern
234 Fourth rear light pattern
300 User terminal
301 Ordering unit
302 Authentication presenting unit
400 Store server
401 Order receiving unit
500 Monitoring server
501 Monitoring target registering unit
502 Monitoring executing unit
600 Network A Signal installation position
B Left-turning point
C Right-turning point
Signal 1 IMU detection signal
Signal 2 Monitoring camera signal
Signal 3 Signal for issuing alarm sounds
Signal 4 Signal for outputting eye-shaped images
Signal 5 Signal for remote operation

What is claimed is:

1. An autonomous vehicle that travels along a set route, comprising:
   a drive unit configured to drive the autonomous vehicle;
   a memory unit configured to store a map data of the set route;
   a first sensor unit configured to sense a traveling state of the autonomous vehicle;
   a second sensor unit configured to sense an object including a person or an obstacle;
   a pair of display units provided on front-left and front-right sides of the autonomous vehicle configured to display eye-shaped images;
   a central processing unit (CPU) configured to control the drive unit, the memory unit, the first sensor unit, the second sensor unit, and the display units; and
   a speaker is provided to output predetermined voices based on state of the autonomous vehicle or the object, wherein
   the first sensor unit comprises
      a position sensor to acquire a current position of the autonomous vehicle, and
      an inertial measurement unit (IMU),
   the second sensor unit comprises
      a monitoring camera for shooting the front, sides, and rear of the autonomous vehicle, and
      a monitoring sensor to acquire images of the object and measure a distance between the object and the autonomous vehicle, wherein
   a control circuit comprises the CPU and a stored program in the memory unit, wherein
      the control circuit controls the drive unit to autonomously travel the autonomous vehicle based on detection signals from the first sensor unit and the second sensor unit and the map data, and controls the display units for displaying the eye-shaped images according to the object, and wherein
      the eye-shaped images are displayed in the display units by control of a line of sight of the respective display unit to output the eye-shaped image that coincides with the traveling state of the autonomous vehicle that goes straight ahead, turns right, turns left, and stops based on the image data detected by the monitoring sensor, the data on distance, or an image shot by the monitoring camera, and
      wherein the control circuit is configured to control a change to the eye-shaped image according to the object,
      wherein when the person is detected by the monitoring sensor,
      a positional information concerning a coordinate and a height of eyes of the person is detected from the monitoring sensor, and the control circuit controls the respective display unit so that the display unit follows the person based on the coordinate showing the positional information concerning the person, and
      the monitoring sensor is configured to detect whether the person has passed the autonomous vehicle, wherein
      when the person has not passed the autonomous vehicle, the display unit is controlled so that the line of sight of the display unit follows the person, and
      when the person has passed the autonomous vehicle, the display unit is controlled to stop allowing the line of sight of the display unit to follow the person, and to output the eye-shaped image that coincides with the traveling state thereby completing the control of changing the line of sight, and
      wherein, further according to the object met during traveling, the control circuit is configured to control the change of the eye-shaped images displayed in the display units and to output the predetermined voices from the speaker.

2. The autonomous vehicle as set forth in claim 1, wherein a first eye-shaped image of looking forward is displayed on the display units when the autonomous vehicle goes straight ahead,
   a second eye-shaped image of looking right is displayed on the display units when the autonomous vehicle turns right, and
   a third eye-shaped image of looking left is displayed on the display units when the autonomous vehicle turns left.

3. The autonomous vehicle as set forth in claim 1, wherein the eye-shaped images change the shape with time.

4. The autonomous vehicle as set forth in claim 1, wherein a display unit is additionally provided on at least one of the rear, left-side, and right-side faces of the autonomous vehicle.

5. The autonomous vehicle as set forth in claim 1, wherein the monitoring sensor is configured with any one of a module for obtaining the positional information by using a monocular camera or a stereo camera, a two-dimensional LiDAR, and a three-dimensional LiDAR.

6. The autonomous vehicle as set forth in claim 1, wherein the eye-shaped image is displayed on the respective display unit in such a way that changes a size or moves left or right according to a situation of the object.

7. The autonomous vehicle as set forth in claim 1, wherein the eye-shaped image is displayed on the display unit so that the left eye and the right eye differ according to a situation of the object.

8. The autonomous vehicle as set forth in claim 1, wherein, when the autonomous vehicle detects the person or the obstacle and stops driving, a fourth eye-shaped image is displayed on the display unit indicating a black eye has moved from being in a middle to a bottom as times passes thereby indicating that the autonomous vehicle has stopped driving.

9. A delivery system, comprising:
   a user terminal;
   a store server to which delivery of a product is requested via the user terminal; an autonomous vehicle that delivers the product in a traveling state along a set route; and
   a monitoring server for monitoring state of the autonomous vehicle, all of the above being connected to a network, wherein
   the user terminal comprises:
      a product ordering unit for ordering the delivery of the product to the store server; and an authentication presenting unit for presenting an authentication code for allowing the autonomous vehicle to authenticate the user terminal, the store server comprises:
a product order receiving unit for receiving an order for the delivery of the product from the user terminal, the autonomous vehicle comprises:
a drive unit configured to drive the autonomous vehicle;
a delivery route setting unit for setting the route of the delivery of the product;
a memory unit configured to store a map data of the set route;
a main body having a housing unit for housing the product;
a first sensor unit configured to sense the traveling state of the autonomous vehicle;
a second sensor unit configured to sense an object including a person or an obstacle;
a pair of display units provided at front-left and front-right sides of the autonomous vehicle configured to display eye-shaped images; and
a monitoring camera for shooting the front and sides of the autonomous vehicle;
a central processing unit (CPU) configured to control the drive unit, the memory unit, the first sensor unit, the second sensor unit, and the display units; and
a speaker is provided to output predetermined voices based on the state of the autonomous vehicle or the object, wherein
the first sensor unit comprises
a position sensor to acquire a current position of the autonomous vehicle, and
an inertial measurement unit (IMU),
the second sensor unit comprises
the monitoring camera for shooting the front, sides, and rear of the autonomous vehicle, and
a monitoring sensor to acquire images of the object and measure a distance between the object and the autonomous vehicle, wherein
a control circuit comprises the CPU and a stored program in the memory unit, wherein
the control circuit controls the drive unit to autonomously travel the autonomous vehicle based on detection signals from the first sensor unit and the second sensor unit and the map data, and controls the display units for displaying the eye-shaped images according to the object, and wherein
the eye-shaped images are displayed in the display units by control of a line of sight of the respective display unit to output the eye-shaped image that coincides with the traveling state of the autonomous vehicle that goes straight ahead, turns right, turns left, and stops based on the image data detected by the monitoring sensor, the data on distance, or an image shot by the monitoring camera, and
wherein the control circuit is configured to control a change to the eye-shaped image according to the object,
wherein when the person is detected by the monitoring sensor,
a positional information concerning a coordinate and a height of eyes of the person is detected from the monitoring sensor, and the control circuit controls the respective display unit so that the display unit follows the person based on the coordinate showing the positional information concerning the person, and
the monitoring sensor is configured to detect whether the person has passed the autonomous vehicle, wherein
when the person has not passed the autonomous vehicle, the display unit is controlled so that the line of sight of the display unit follows the person, and
when the person has passed the autonomous vehicle, the display unit is controlled to stop allowing the line of sight of the display unit to follow the person, and to output the eye-shaped image that coincides with the traveling state thereby completing the control of changing the line of sight, and
wherein, further according to the object met during traveling, the control circuit is configured to control the change of the eye-shaped images displayed in the display units and to output the predetermined voices from the speaker.

10. The delivery system as set forth in claim 9, wherein the monitoring server comprises: a monitoring target registering unit for registering the autonomous vehicle; and a monitoring executing unit for periodically monitoring the state of the autonomous vehicle.

11. The delivery system as set forth in claim 10, wherein the autonomous vehicle comprises: a state transmitting/receiving unit for transmitting the state of the autonomous vehicle to the monitoring server and receiving control signals from the monitoring server,
the state transmitting/receiving unit transmits, as required, a sensor information concerning the state of the autonomous vehicle and an image information from the monitoring camera to the monitoring server, and
transmits the state of the autonomous vehicle to the monitoring server in response to a request from the monitoring executing unit of the monitoring server.

12. The delivery system as set forth in claim 10, wherein, when the monitoring executing unit determines by signals from the IMU that a trouble is occurring to the autonomous vehicle, the monitoring executing unit sends a signal to the autonomous vehicle to issue an alarm sound, controls the autonomous vehicle by remote control, and outputs a predetermined alarm sound from the speaker of the autonomous vehicle, the monitoring executing unit then monitors the signal from the IMU and a signal from the monitoring camera to determine whether the trouble has been resolved, and, when the trouble has been resolved, the monitoring executing units stops the output of the alarm sound.

13. The delivery system as set forth in claim 10, wherein, when the monitoring executing unit detects a change in the IMU in the autonomous vehicle that may attempt to open a door of the autonomous vehicle or steal the autonomous vehicle and a trouble for the change that has not been resolved, the monitoring executing unit judges that stealing will occur and sends a signal to the autonomous vehicle to issue an alarm sound and outputs the alarm sound at maximum volume, and remotely operates the autonomous vehicle by sending a signal to output the eye-shaped image with a brave-looking appearance in the display unit to prevent stealing.

14. A processor connected to the memory unit storing the stored program, wherein the program configures the processor to execute operations for allowing a computer to operate as the store server as set forth in claim 9.

15. A non-transitory computer-readable medium storing the stored program for allowing the computer to operate as the store server as set forth in claim 14.

16. A processor connected to the memory unit storing the stored program, wherein the program configures the processor to execute operations for allowing a computer to operate as the monitoring server as set forth in claim 9.

17. A non-transitory computer-readable medium storing the stored program for allowing the computer to operate as the monitoring server as set forth in claim 16.

18. A processor connected to the memory unit storing the stored program, wherein the program configures the processor to execute operations for allowing a computer to operate as the user terminal as set forth in claim 9.

19. A non-transitory computer-readable medium storing the stored program for allowing the computer to operate as the user terminal as set forth in claim 18.

20. An autonomous vehicle that travels along a set route, the autonomous vehicle comprising:
 a drive unit configured to drive the autonomous vehicle;
 a memory unit configured to store a map data of the set route;
 a first sensor unit configured to sense a traveling state of the autonomous vehicle;
 a second sensor unit configured to sense an object including a person or an obstacle;
 a pair of display units provided on front-left and front-right sides of the autonomous vehicle configured to display eye-shaped images;
 a central processing unit (CPU) configured to control the drive unit, the memory unit, the first sensor unit, the second sensor unit, and the display units; and wherein
 the first sensor unit comprises
  a position sensor to acquire a current position of the autonomous vehicle, and
  an inertial measurement unit (IMU),
 the second sensor unit comprises
  a monitoring camera for shooting the front, sides, and rear of the autonomous vehicle, and
  a monitoring sensor to acquire images of the object and measure the distance between the object and the autonomous vehicle, wherein
 a control circuit comprises the CPU and a stored program in the memory unit, wherein
 the control circuit controls the drive unit to autonomously travel the autonomous vehicle based on detection signals from the first sensor unit and the second sensor unit and the map data, and controls the display units for displaying the eye-shaped images according to the object, and wherein
 the eye-shaped images are displayed in the display units by control of a line of sight of the respective display unit to output the eye-shaped image that coincides with the traveling state of the autonomous vehicle that goes straight ahead, turns right, turns left, and stops based on the image data detected by the monitoring sensor, the data on distance, or an image shot by the monitoring camera, and
wherein the control circuit is configured to control a change to the eye-shaped image according to the object,
 wherein when the person is detected by the monitoring sensor,
 a positional information concerning a coordinate and a height of eyes of the person is detected from the monitoring sensor, and the control circuit controls the respective display unit so that the display unit follows the person based on the coordinate showing the positional information concerning the person, and
 the monitoring sensor is configured to detect whether the person has passed the autonomous vehicle, wherein
 when the person has not passed the autonomous vehicle, the display unit is controlled so that the line of sight of the display unit follows the person, and
 when the person has passed the autonomous vehicle, the display unit is controlled to stop allowing the line of sight of the display unit to follow the person, and to output the eye-shaped image that coincides with the traveling state thereby completing the control of changing the line of sight, and
wherein, further according to the object met during traveling, the control circuit is configured to control the change of the eye-shaped images displayed in the display units.

\* \* \* \* \*